Dec. 9, 1952     F. CIBOROWSKI     2,620,843
TIRE CHAIN

Filed Jan. 5, 1949     4 Sheets-Sheet 1

INVENTOR.
Frank Ciborowski
BY Charles R. Fay,
Attorney

Dec. 9, 1952  F. CIBOROWSKI  2,620,843
TIRE CHAIN
Filed Jan. 5, 1949  4 Sheets-Sheet 2
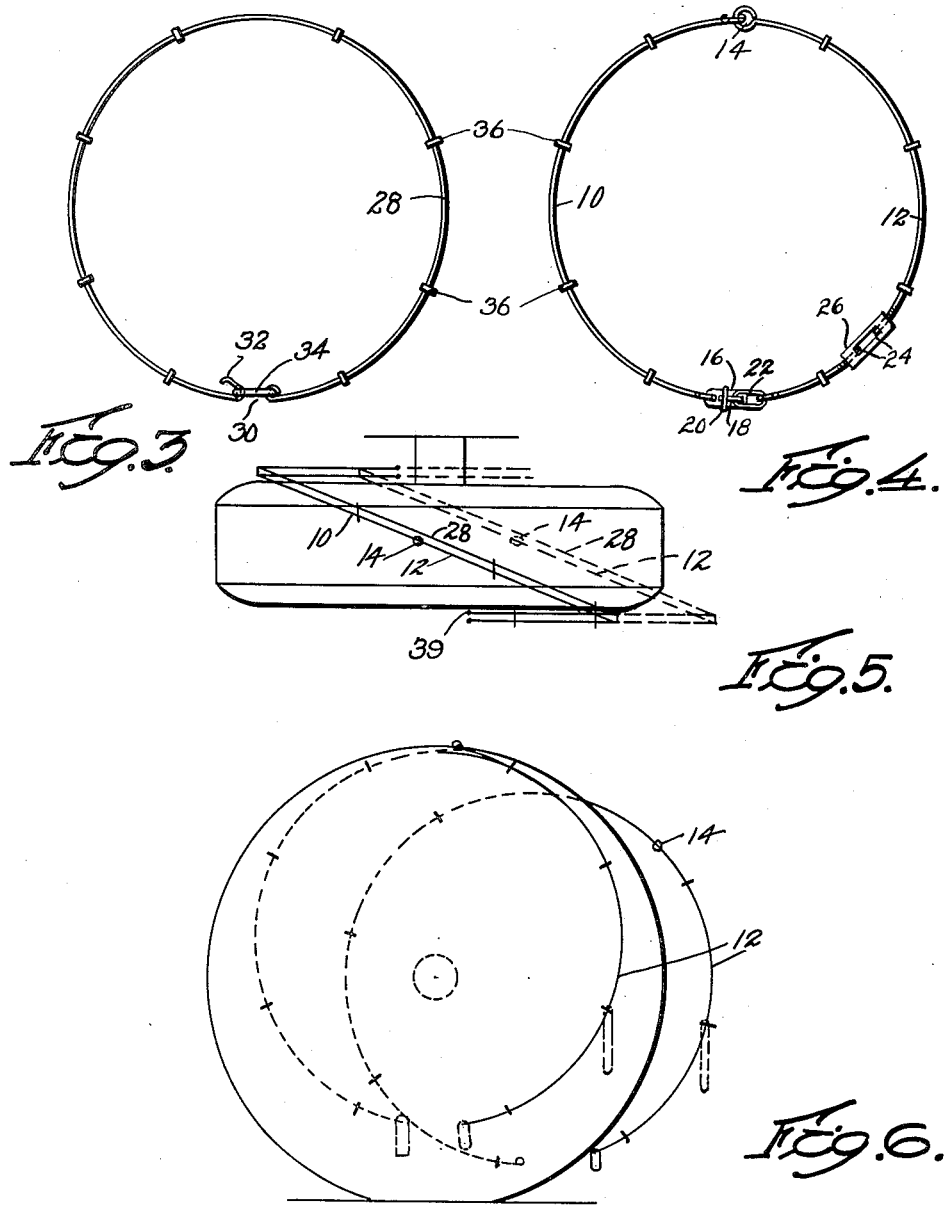
INVENTOR.
Frank Ciborowski
BY Charles R. Fay,
Attorney Dec. 9, 1952 F. CIBOROWSKI 2,620,843
TIRE CHAIN
Filed Jan. 5, 1949 4 Sheets-Sheet 3

INVENTOR.
Frank Ciborowski
BY Charles R. Fay,
ATTORNEY

Dec. 9, 1952　　　　　F. CIBOROWSKI　　　　　2,620,843
TIRE CHAIN

Filed Jan. 5, 1949　　　　　　　　　　　　　4 Sheets-Sheet 4

INVENTOR.
Frank Ciborowski
BY Charles R. Fay
Attorney

Patented Dec. 9, 1952

2,620,843

UNITED STATES PATENT OFFICE 2,620,843

TIRE CHAIN

Frank Ciborowski, Worcester, Mass.

Application January 5, 1949, Serial No. 69,263

5 Claims. (Cl. 152—242)

This invention relates to new and improved tire chains for vehicle wheels and the principal object of the invention resides in the provision of tire chains of the class described which can be easily and quickly applied to and removed from vehicle wheels of any description.

A further object of the invention resides in the provision of tire chains as above described comprising a circular semi-rigid resilient length of wire having a pair of ends adapted to be connected together easily as by means of a pivoted link and a hook and forming the inside run of the chain to be described; an outside run of wire comprising a pair of semi-circular, semi-rigid pieces pivoted together, and tightening or take-up means for connecting the same at a point opposite the pivot, and means on both of said runs providing for the anchoring of the end hooks of cross chains thereto, to the end that the entire tire chain may be very easily and quickly applied to a vehicle wheel in a novel manner as will be made clear hereinafter.

Other objects and advantages of the invention will appear hereinafter.

Reference is to be had to the accompanying drawings in which

Fig. 3 is a view on a reduced scale of the inside wire run;

Fig. 4 is a similar view of the outside wire run;

Fig. 5 is a diagrammatical top plan view illustrating a step in the application of the new tire chain to a vehicle wheel;

Figure 1:
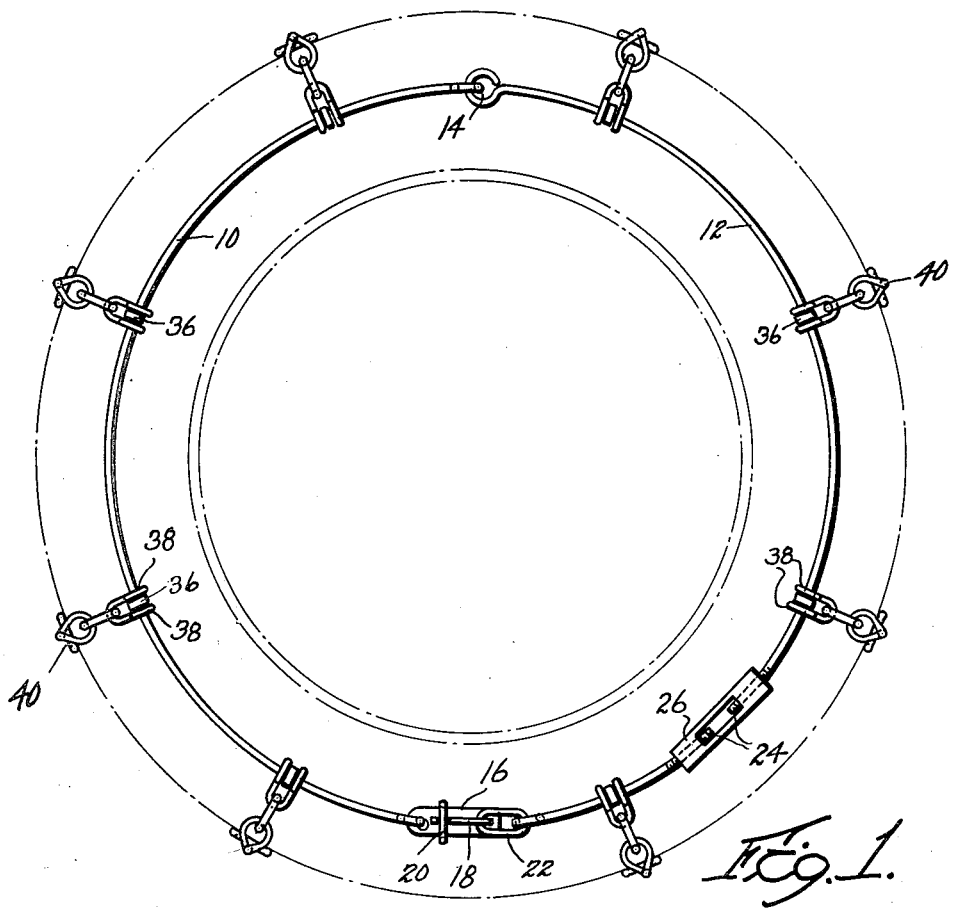
Fig. 1 is a view in the outside aspect thereof of a vehicle wheel showing my new tire chain in place thereon.
Figure 2:
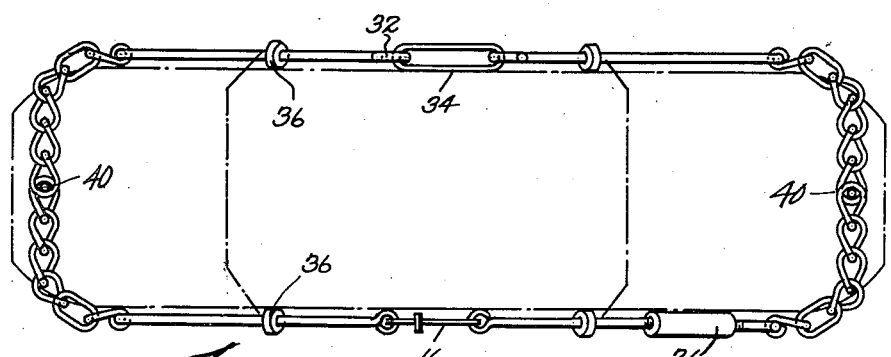
Fig. 2 is a bottom plan view of the wheel of Fig. 1.

Fig. 6 illustrates the parts in the same positions relative to the wheel that they are in Fig. 5 but in a front elevational view; and Figs. 7 and 7a, 8 and 8a, and 9 and 9a are further diagrammatical views illustrating the manner in which the new chain is applied to a vehicle wheel.

My new tire chain comprises an outside run comparable to a side chain of a conventional tire chain, comprising a pair of separate semi-circular, semi-rigid wire parts 10 and 12 having a type of hook and eye pivot securement at 14. Opposite the pivot means 14, there is a chain tightener of a known type which comprises a plate 16, a pivot hook 18 and a slider 20, the hook extending through a link 22 at the free end of run 12 and being pivoted over and locked in position by means of the slider 20.

The wire run 12 is divided in two parts, as indicated at 24, and these two parts are threaded and are engaged by a turn buckle 26 so as to further adjustably tighten the outside run 10 and 12 of the new tire chain.

The inside run comprises a single wire of semi-rigid material as generally indicated at 28, see Fig. 3. This wire run is generally circular but it has an opening at 30 and one end thereof is provided with a hook 32, the other end having a pivoted link 34 which is easily engageable over the hook 32, especially because the wire run 28 is semi-rigid but springy and in general maintains the shape as shown in Fig. 3. Hence, with the run 28 on the vehicle wheel it is merely necessary to pivot the link 34 over the hook 32 to positively engage the two ends of the inside run.

Each of the inside and the outside runs have disposed thereon at equally spaced intervals lugs 36 which receive at each side thereof the hooks 38 commonly found at the ends of cross chains 40 and these lugs 36 lock the cross chains and prevent them from sliding around the wire runs.

Turning now to Figs. 5 and 6, the outside run 10, 12 is placed together with the inside run 28 and disposed crossways over the top of the tire with corresponding ends of runs 10 and 28 being located behind the tire and to the left of the observer, assuming that the wheel shown in Fig. 5 is the left-hand rear wheel of the vehicle. The other ends of both 12 and 28 remain to the outside of the wheel.

The wire runs are then moved to the right as shown in dotted lines in Fig. 5 and this motion is also made downwardly, as indicated in Fig. 6, that the connections 18 and 34 are at the lowermost part of the wheel and to the rear thereof.

Figure 7A:
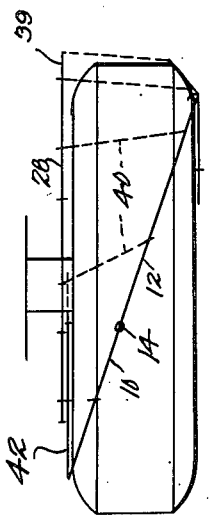
Figure 7:
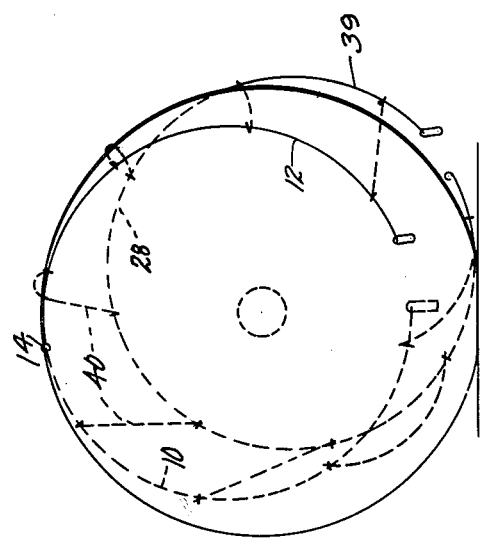

The end of the inside wire run which is still outside with respect to the wheel, as indicated at 39 in Fig. 5, is then pushed inwardly inside the wheel as shown in Fig. 7a and the ends thereof are now secured together by the pivoted link 34.

Figure 8A:
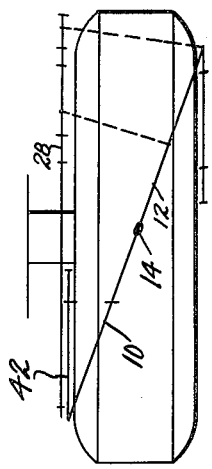
Figure 8:
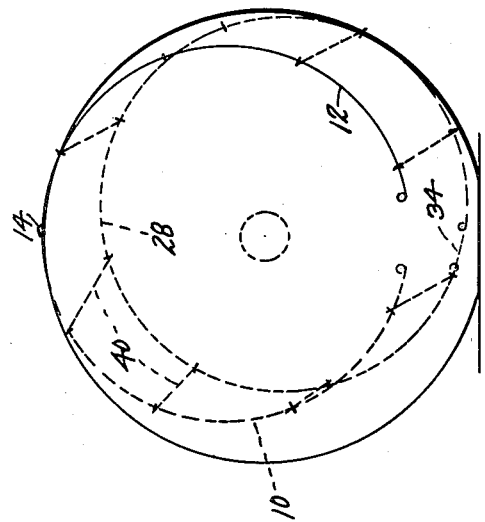
Figures 9, 9A:
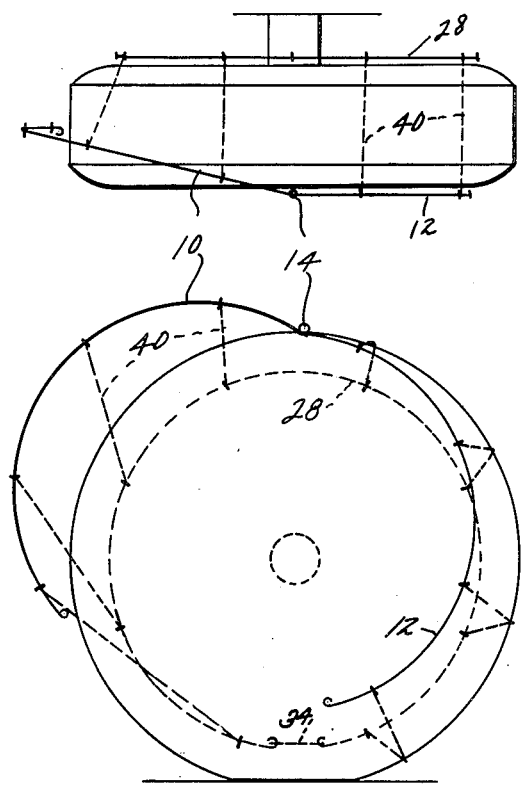

After the securement of the inside wire run has been completed, the inside run 28 is pushed up and to the left and the outside wire run is pushed down to the left as far as possible, see Figs. 8 and 8a, whereupon the end of the outside wire run 10 which is inside the wheel as indicated at 42, is brought up and over to the outside, as will be seen in Fig. 9, whereupon the ends of the outside run may be secured together by the tightener above described and the turn buckle is then tightened to suit.

This invention provides a new and improved complete tire chain which is much more easily applied to and removed from vehicle wheels and which certainly costs no more to manufacture than conventional chains.

Having thus described my invention and the advantages thereof, I do not wish to be limited to the details herein disclosed otherwise than as set forth in the claims, but what I claim is:

1. Tire chain assembly comprising a semi-rigid resilient wire substantially in the shape of a circle and having spaced ends, means to connect said ends, said circular shaped wire being the inside wire run for attachment of a series of cross chains to a vehicle wheel, a pair of semi-circular wires pivoted together at corresponding ends, means to connect the opposite ends together, said semi-circular wires forming an outside wire run, a series of cross chains secured at spaced intervals to the respective wires, said cross chains positioning the pivot joint of the semi-circular wires approximately at the center of the inside run wire.

2. The tire chain of claim 1 including a turnbuckle located intermediate the ends of one of the semi-circular wires.

3. A tire chain comprising a pair of side runs and a series of connecting cross chains, one run comprising a single length of wire in circular form having a pair of ends, means to connect said ends, the other run comprising a pair of semi-circular wire lengths pivoted together at corresponding ends, means to connect the other ends thereof, the said one run being adapted for the inside aspect of a vehicle wheel and the other run for the outside aspect thereof, and adjusting means on the outside run for tightening the same.

4. The tire chain of claim 3 wherein said adjusting means includes a turn buckle disposed intermediate the ends of one of the semi-circular wire lengths.

5. Tire chain assembly comprising a semi-rigid resilient wire substantially in the shape of a circle and having spaced ends, means to connect said ends, said circular shaped wire being the inside wire run for attachment of a series of cross chains to a vehicle wheel, a pair of semi-circular wires pivoted together at corresponding ends, means to connect the opposite ends together, said semi-circular wires forming an outside run, a series of cross chains secured at spaced intervals to the respective wires, and a separate take-up adjusting means on one of the pair of semi-circular wires.

FRANK CIBOROWSKI.

REFERENCES CITED

The following references are of record in the file of this patent:

UNITED STATES PATENTS

| Number | Name | Date |
|---|---|---|
| 1,248,212 | Walden | Nov. 27, 1917 |
| 1,277,273 | Whistler | Aug. 27, 1918 |
| 1,400,896 | Mestars | Dec. 20, 1921 |
| 2,328,808 | Holtz | Sept. 7, 1943 |
| 2,458,642 | Reynolds | Jan. 11, 1949 |
| 2,493,994 | Newman | Jan. 10, 1950 |

FOREIGN PATENTS

| Number | Country | Date |
|---|---|---|
| 680,120 | France | Jan. 17, 1930 |